United States Patent
Bates et al.

(10) Patent No.: US 7,813,250 B2
(45) Date of Patent: Oct. 12, 2010

(54) APPARATUS AND METHOD TO DETERMINE AN OPTIMAL POWER LEVEL TO ENCODE INFORMATION HOLOGRAPHICALLY

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 11/737,670

(22) Filed: Apr. 19, 2007

(65) Prior Publication Data

US 2008/0259763 A1 Oct. 23, 2008

(51) Int. Cl.
G11B 7/00 (2006.01)
(52) U.S. Cl. ...................... 369/103
(58) Field of Classification Search .......... 369/103, 369/47.5–47.52, 116, 53.26; 359/10, 11, 359/22, 27, 32, 33
See application file for complete search history.

(56) References Cited

U.S. PATENT DOCUMENTS

| | | | | |
|---|---|---|---|---|
| 4,548,463 A | * | 10/1985 | Cato et al. | 359/18 |
| 5,602,657 A | * | 2/1997 | Dickson et al. | 369/103 |
| 6,765,851 B2 | | 7/2004 | Kawashima et al. | |
| 7,623,279 B1 | * | 11/2009 | Ayres | 359/22 |
| 2005/0078578 A1 | | 4/2005 | Sasaki | |
| 2005/0147015 A1 | | 7/2005 | Seo | |
| 2005/0174621 A1 | * | 8/2005 | Edwards | 359/32 |
| 2005/0249095 A1 | * | 11/2005 | Tanaka et al. | 369/103 |
| 2006/0092792 A1 | | 5/2006 | Hanks et al. | |
| 2006/0092793 A1 | | 5/2006 | Hanks et al. | |
| 2006/0279822 A1 | * | 12/2006 | Kmeta et al. | 359/15 |
| 2007/0253043 A1 | * | 11/2007 | Bates et al. | 359/35 |
| 2008/0062796 A1 | * | 3/2008 | Bates et al. | 369/103 |
| 2008/0068686 A1 | * | 3/2008 | Elliott et al. | 359/24 |
| 2008/0071980 A1 | * | 3/2008 | Elliott et al. | 711/111 |

FOREIGN PATENT DOCUMENTS

| | | |
|---|---|---|
| JP | 2003109240 | 4/2003 |
| JP | 2005190519 | 7/2005 |
| WO | 2005103842 | 11/2005 |

* cited by examiner

Primary Examiner—Thang V Tran
(74) Attorney, Agent, or Firm—Dale F. Regelman; Quarles & Brady LLP (57) ABSTRACT

A method is disclosed to determine an optimal power level to encode information holographically. The method sets (N) evaluation power levels, displays an evaluation image on a spatial light modulator. For each value of (i), the method energizes a light source using the (i)th power level, generates the (i)th reference beam, generates the (i)th carrier beam, forms the (i)th data beam comprising the evaluation image, forms the (i)th hologram using the (i)th reference beam and the (i)th data beam, and encodes the (i)th hologram in a holographic data storage medium, where (i) is greater than or equal to 1 and less than or equal to (N).

20 Claims, 10 Drawing Sheets

APPARATUS AND METHOD TO DETERMINE AN OPTIMAL POWER LEVEL TO ENCODE INFORMATION HOLOGRAPHICALLY

FIELD OF THE INVENTION

This invention relates to an apparatus, and method using that apparatus, to determine an optimal power level to encode information holographically.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce, for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to determine an optimal power level to encode information holographically. The method supplies a holographic data storage system comprising a light source, an evaluation image, a spatial light modulator, an optical detector, and a holographic data storage medium.

The method sets (N) power levels for evaluation, wherein (N) is greater than 1. The method further displays the evaluation image on the spatial light modulator and selects the (i)th power level, wherein (i) is initially set to 1, and wherein (i) is greater than or equal to 1 and less than or equal to (N). The method energizes the light source using the (i)th power level, generates the (i)th reference beam, generates the (i)th carrier beam, forms the (i)th data beam comprising the evaluation image, forms the (i)th hologram using the (i)th reference beam and the (i)th data beam, and encodes the (i)th hologram in the holographic data storage medium.

The method then determines if (i) equals (N). If (i) does not equal (N), then the method increments (i) by unity, and repeats the energizing step, the generating steps, the forming steps, the encoding step, the determining step, and optionally the incrementing step and the repeating step.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIGS. 1, 2, 5, and 6, holographic data storage system 100 comprises laser light source 105, beam splitter 107, reflective spatial light modulator 110, optical detector 140, and holographic storage medium 195. The light generated by source 105 is split by beam splitter 107 into reference beam 190, and carrier beam 170.

Figure 1:
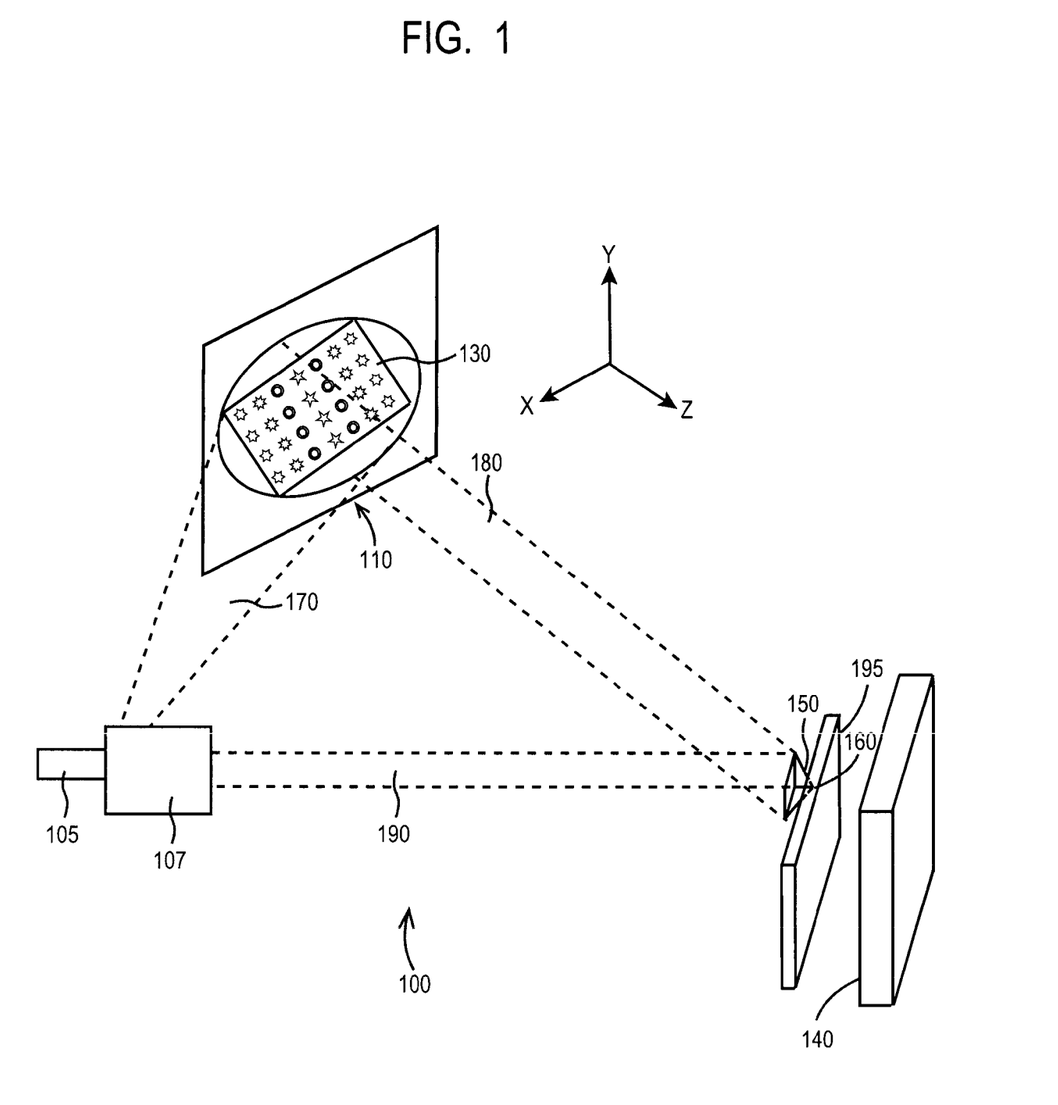
FIG. 1 is a perspective view of one embodiment of Applicants' holographic data storage system shown being used to encode information into a holographic data storage medium.

In the illustrated embodiment of FIG. 1, an image 130 is shown displayed on reflective spatial light modulator ("RSLM") 110, wherein image 130 comprises Applicants' evaluation image. In certain embodiments, RSLM 110 comprises an assembly comprising a plurality of micro mirrors. In other embodiments, RSLM 110 comprises a liquid crystal on silicon ("LCOS") display device. In contrast to nematic twisted liquid crystals used in Liquid Crystal Displays ("LCDs"), in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 170 picks up image 130 as the light is reflected off RSLM 110 to form reflected data beam 180 comprising image 130. Unreflected reference beam 190 interferes with data beam 180 to form hologram 150, wherein hologram 150 comprises Applicants' evaluation image. Hologram 150 is formed within storage medium 195 thereby causing the photo-active storage medium to create interference pattern 160 comprising an encoded hologram 150.

Figure 5:
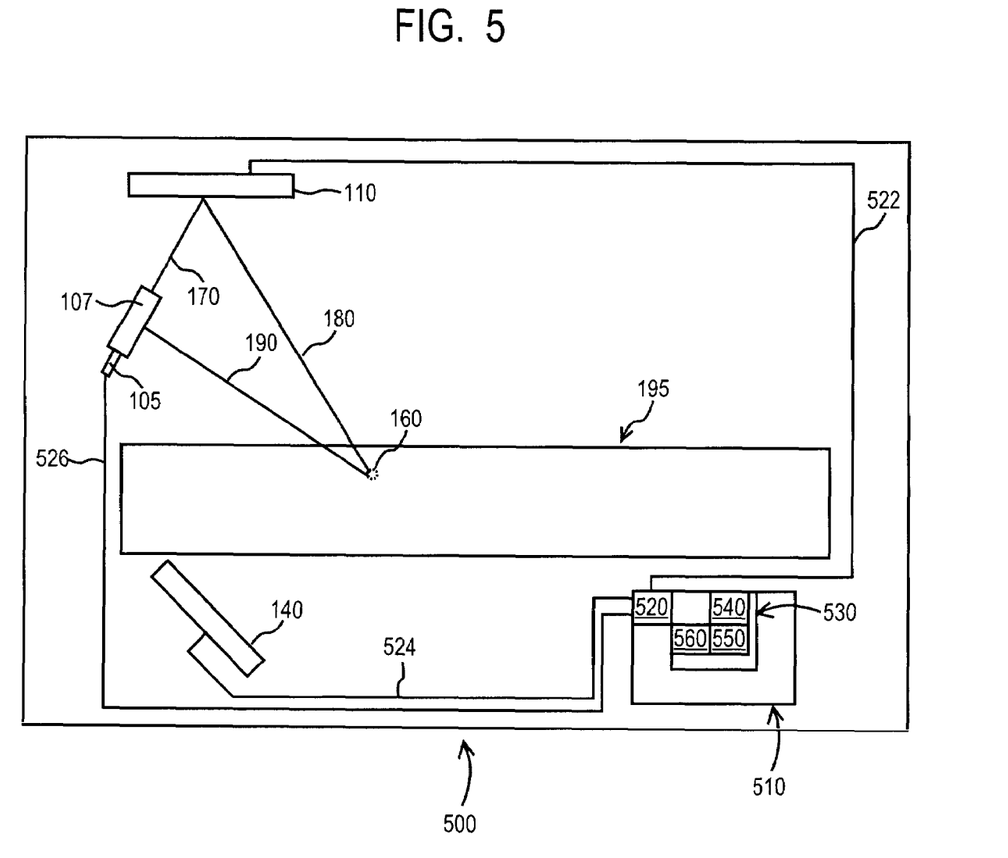
FIG. 5 is a block diagram showing Applicants' holographic data drive being used to encode information into a holographic data storage medium.
Figure 6:
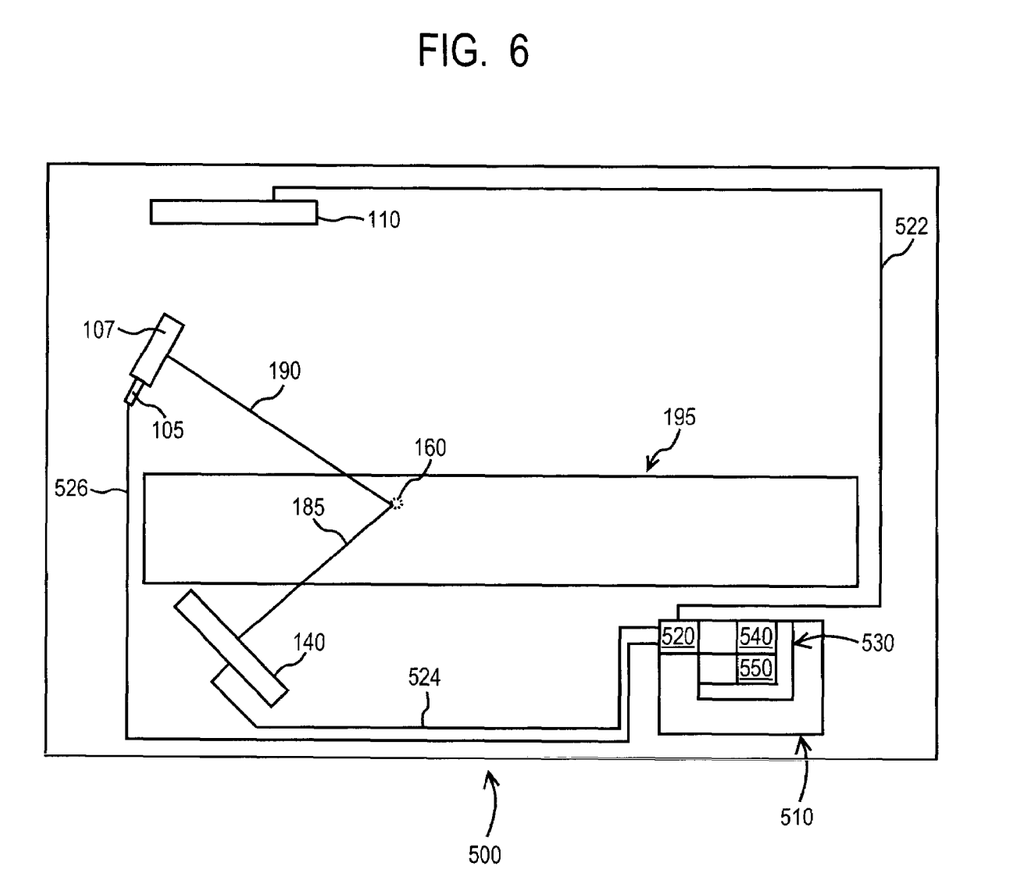
FIG. 6 is a block diagram showing the holographic data drive of FIG. 5 being used to decode information encoded in a holographic data storage medium.

In the illustrated embodiment of FIG. 5-6, holographic data drive 500 comprises the elements of data storage system 100 disposed within housing 505. Holographic data drive 500 further comprises drive controller 510 which comprises processor 520 and memory 530. In the illustrated embodiment of FIG. 5, microcode/instructions 540 and matched filter 560 are written to memory 530. Further in the illustrated embodiment of FIG. 5-6, Applicants' evaluation image is written to memory 530 as stored evaluation image 550.

Controller 510 communicates with RSLM 110 via communication link 522. Controller 510 communicates with optical detector 140 via communication link 524. Controller 510 communicates with light source 105 via communication link 526.

Figure 2:
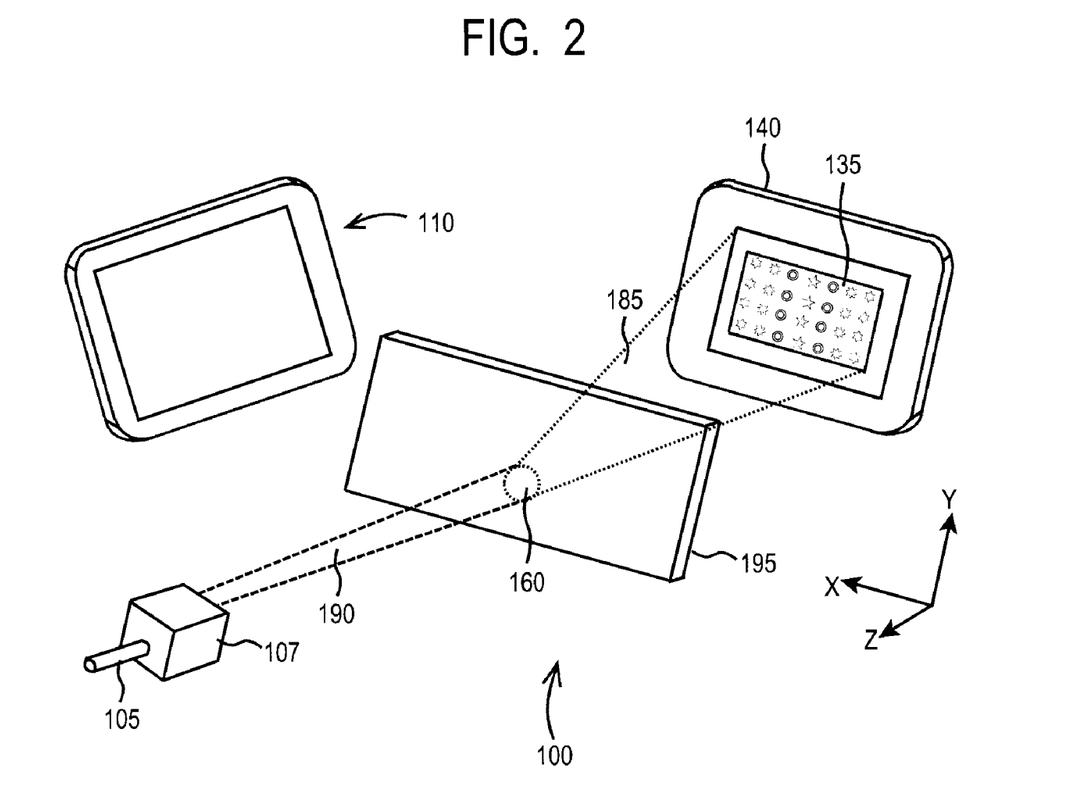
FIG. 2 is the holographic data storage system of FIG. 1 shown being used to decode information encoded in a holographic data storage medium.

FIGS. 2 and 6 show reference beam 190 directed toward encoded holographic storage medium 195 such that reference beam 190 is diffracted by interference pattern 160 which comprises hologram 150 (FIG. 1) to form reconstructed data beam 185 which comprises reconstructed evaluation image 135. Reconstructed data beam 185 is projected onto optical detector 140. The plurality of detector elements comprising optical detector 140 then capture the information comprising image 135.

Figure 3:
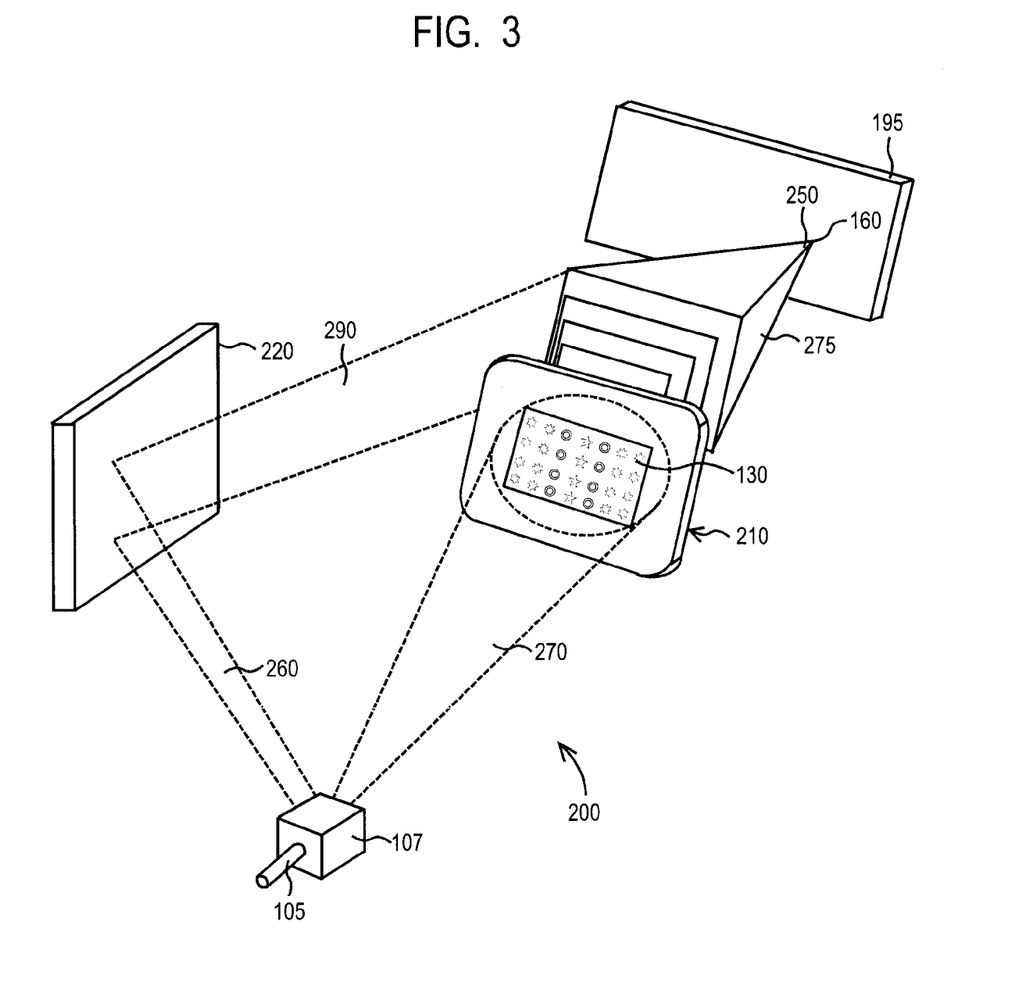
FIG. 3 is a perspective view of a second embodiment of Applicants' holographic data storage system shown being used to encode information into a holographic data storage medium.

FIG. 3 illustrates a holographic data storage system 200. System 200 comprises a laser light source 105, a laser splitter 107, carrier beam 270, and reference beam 260. In the illustrated embodiment of FIG. 2A, system 200 further comprises a transmissive spatial light modulator ("TSLM") 210, a data beam 275, a mirror 220, and a holographic data storage medium 195.

In certain embodiments, TSLM 210 comprises an LCD-type device. The TSLM 210 is typically translucent, where information is represented by either a light or a dark pixel on the TSLM 210 display. Laser light originating from the laser source 205 is split by the beam splitter 107 into two beams, a carrier beam 270 and a reference beam 260.

The carrier beam 270 picks up the image 130 displayed by the TSLM 210 as the light passes through the TSLM 210, wherein image 130 comprises a displayed evaluation image. Reference beam 260 is reflected by the mirror 220 to produce reflected reference beam 290. Reflected reference beam 290 interferes with the data beam 275 to form hologram 250. Hologram 250 is encoded into holographic data storage medium 195, as interference pattern 160 (FIGS. 1, 2, 3, 4, 5, 6).

Figure 4:
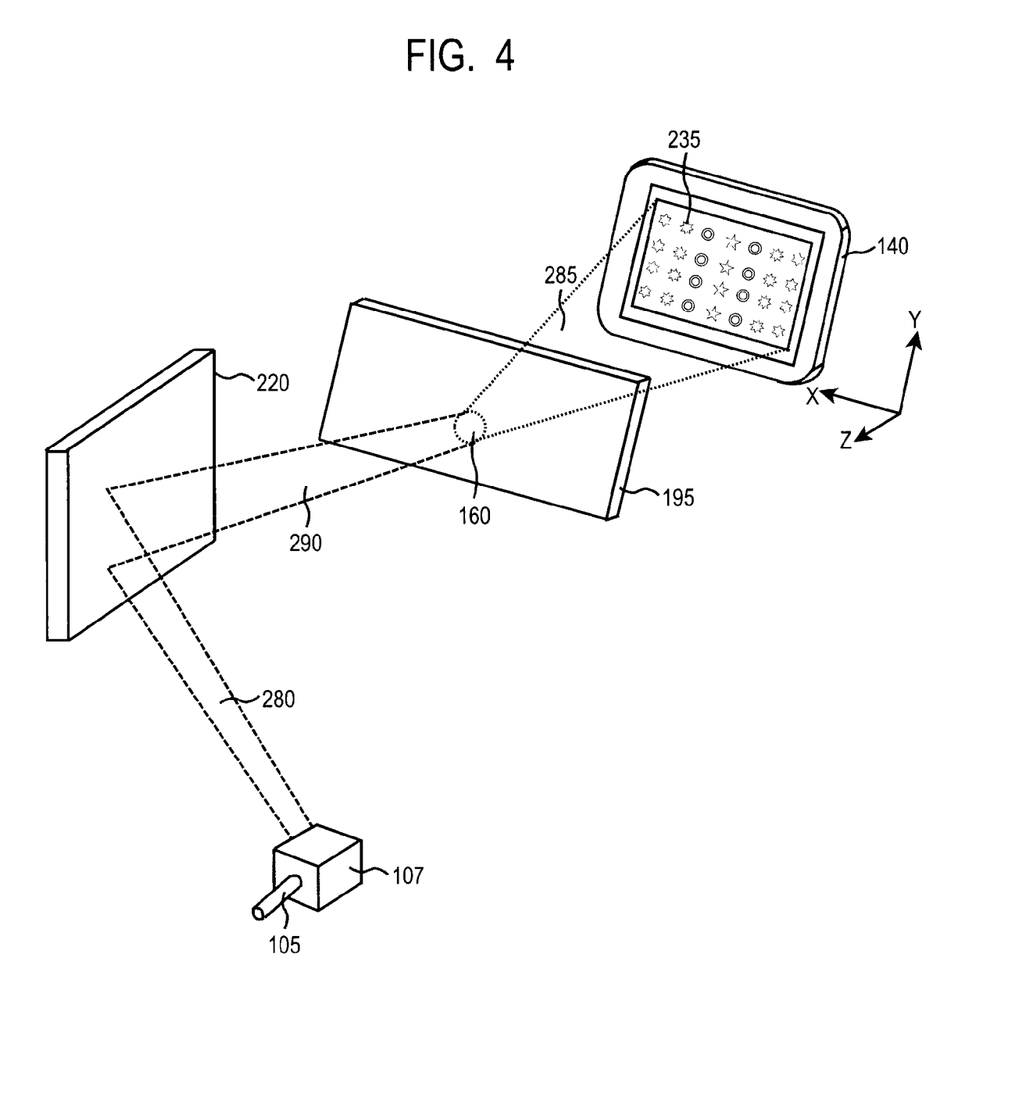
FIG. 4 is the holographic data storage system of FIG. 3 shown being used to decode information encoded in a holographic data storage medium.

FIG. 4 shows laser light 105 split, beam splitter 107, and reference beam 280. Reference beam 280 is reflected off of mirror 220 to become reflected reference beam 290 which is directed toward encoded holographic storage medium 195 such that reflected reference beam 290 is diffracted by the interference pattern 160 to form reconstructed data beam 285 which comprises reconstructed evaluation image 235. Image 235 is projected onto the optical detector 140. The plurality of detector elements comprising optical detector 140 then capture the information comprising image 235.

Figure 7:
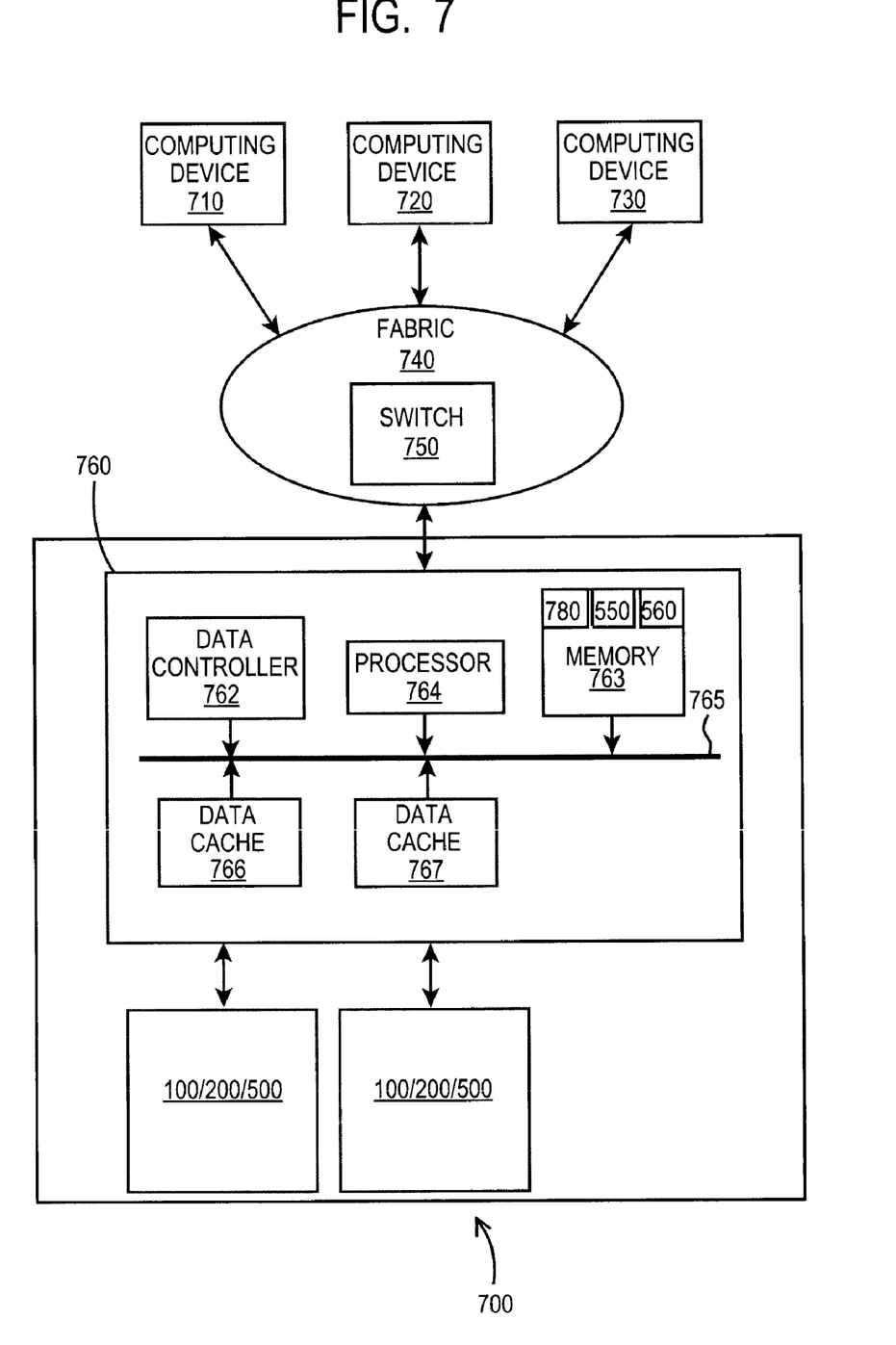
FIG. 7 is a block diagram showing one embodiment of Application's data storage system.

FIG. 7 illustrates one embodiment of Applicants' data storage system 700. In the illustrated embodiment of FIG. 7, data storage system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage system 700 comprises holographic data storage system 100 (FIGS. 1, 2), and/or holographic data storage system 200 (FIGS. 3, 4), and/or holographic drive 500 (FIGS. 5, 6).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, processor 764, and data caches 766 and 767, wherein these components communicate through a data bus 765. Memory 763 comprises microcode/instructions 780, stored evaluation image 550, and matched filter 560.

In certain embodiments, memory 763 comprises a magnetic information storage medium, an optical information storage medium, an electronic information storage medium, and the like. By "magnetic storage medium," Applicants mean, for example, a device such as a hard disk drive, floppy disk drive, or magnetic tape. By "optical information storage medium," Applicants mean, for example, a Digital Versatile Disk ("DVD"), High-Definition DVD ("HD-DVD"), Blu-Ray Disk ("BD"), Magneto-Optical ("MO") disk, Phase-Change ("PC") disk, etc. By "electronic storage media," Applicants mean, for example, a device such as a PROM, EPROM, EEPROM, Flash PROM, compactflash, smartmedia, and the like. In certain embodiments, memory 768 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a plurality of convolution encoded data images. Those data images are transferred to RSLM 110 (FIGS. 1, 2, 5, 6) and/or TSLM 210 (FIGS. 3, 4) disposed in one or more of holographic data storage system 100 (FIGS. 1, 2) and/or holographic data storage system 200 (FIGS. 3, 4), and/or holographic drive 500 (FIGS. 5, 6).

In certain embodiments, holographic data storage systems 100 and 200 are located in different geographical places. In certain embodiments, storage controller 760 distributes information between two or more holographic data storage systems in order to safeguard the information.

Figure 9:
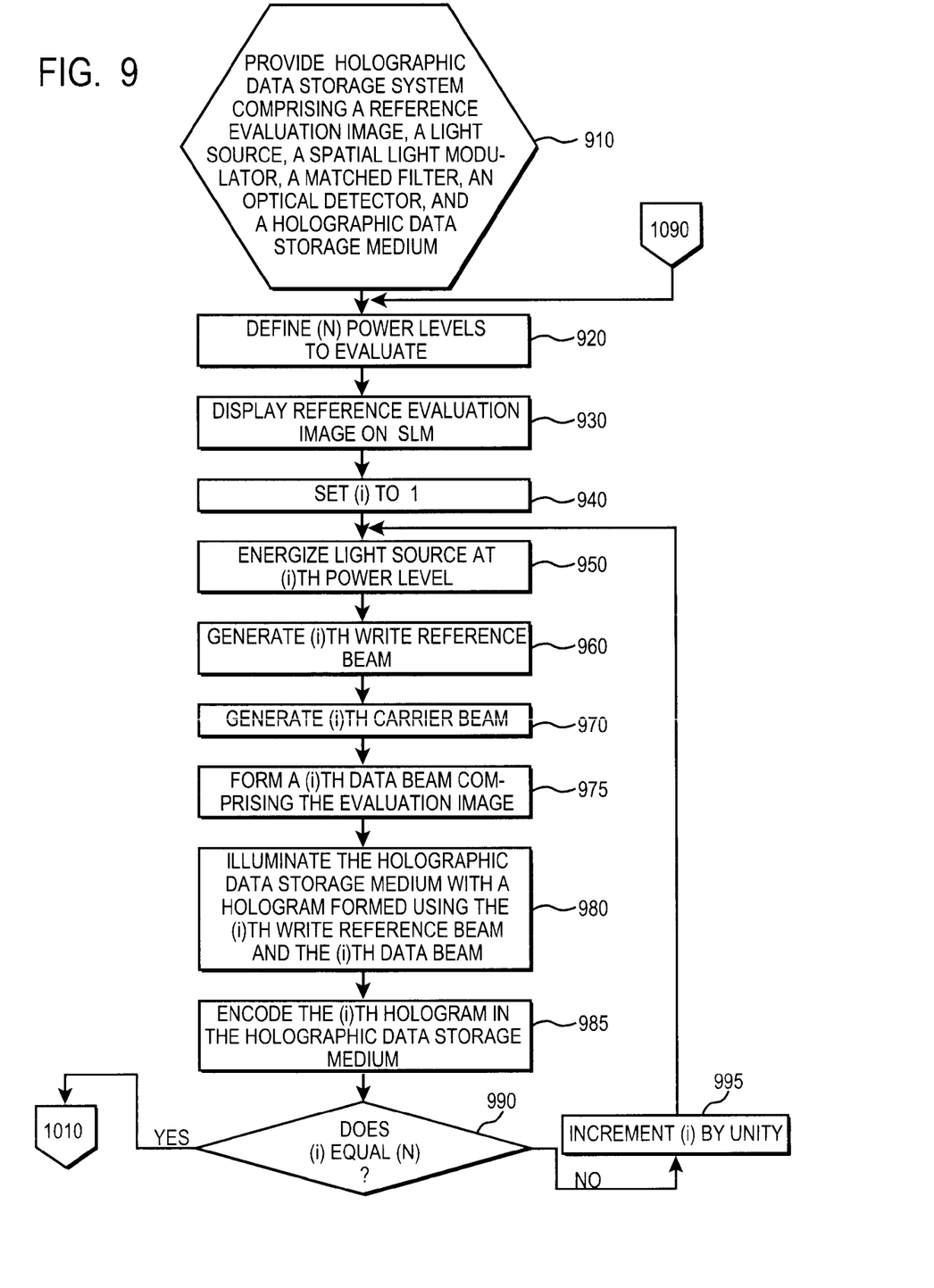
FIG. 9 is a flow chart summarizing the initial steps of Applicants' method.
Figure 10:
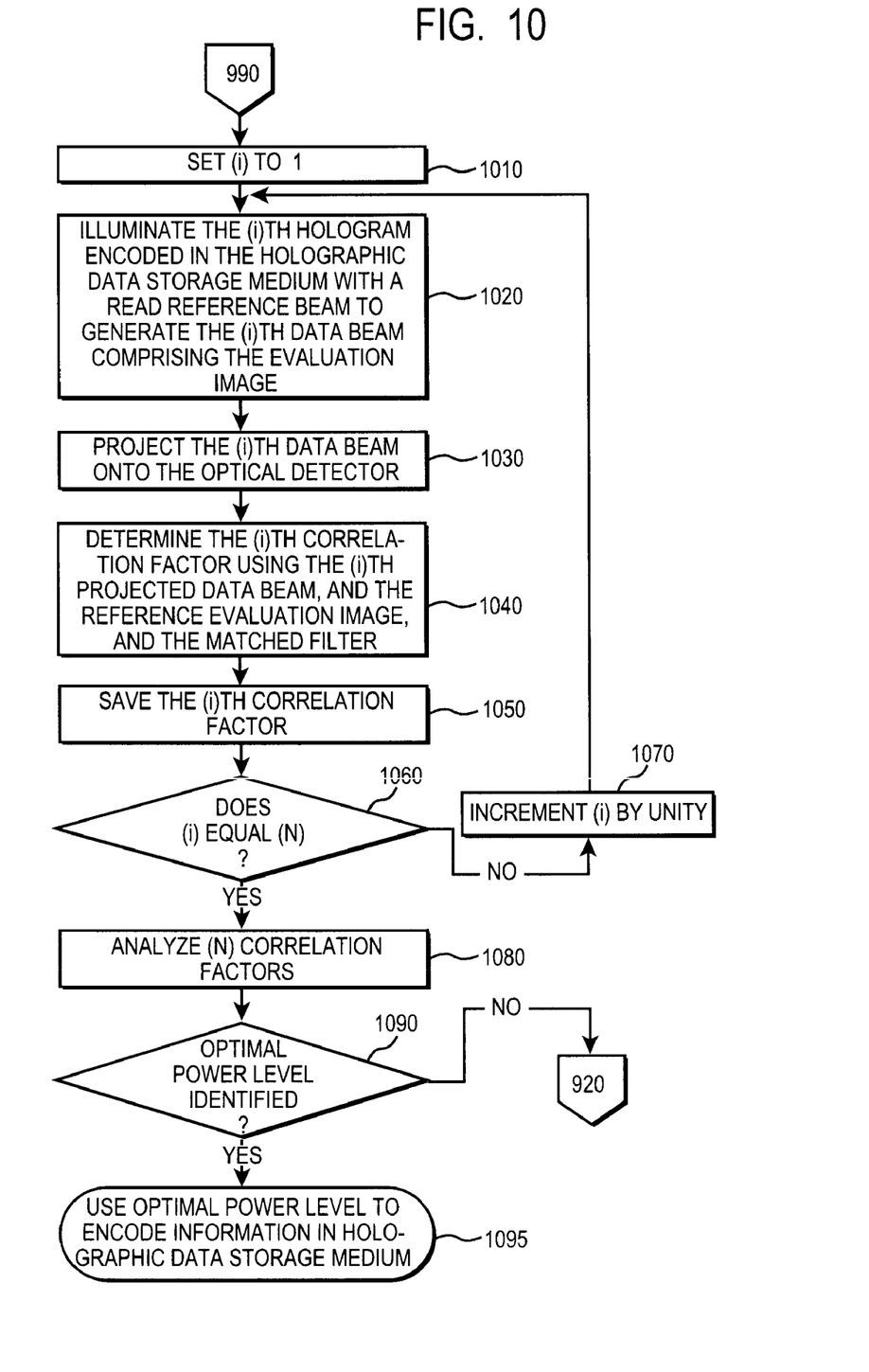
FIG. 10 is a flow chart summarizing additional steps of Applicants' method.

Applicants' invention comprises a method using Applicants' apparatus described hereinabove to determine an optimal power level to encode information holographically. FIGS. 9 and 10 summarize Applicants' method.

Referring now to FIG. 9, in step 910 Applicants' method provides a holographic data storage system, such as for example Applicants' holographic data storage system 100 (FIGS. 1, 2), or data storage system 200 (FIGS. 3, 4), or holographic data drive 500 (FIGS. 5, 6). In certain embodiments, holographic data storage system 100 or 200 is interconnected with a storage controller, such as for example and without limitation storage controller 760 (FIG. 7).

In step 920, Applicants' method defines (N) power levels for evaluation. In certain embodiments, step 920 is performed by drive controller 510 (FIGS. 5, 6). In certain embodiments, step 920 is performed by storage controller 760 (FIG. 7). In certain embodiments, step 920 is performed by the operator of the data storage system of step 910. In certain embodiments, step 920 is performed by the manufacturer of the data storage system of step 910.

In certain embodiments, (N) is 3. In other embodiments, (N) is greater than 3. In certain of the (N)=3 embodiments, the first power level $P_1$ equals the second power level $P_2$ minus an incremental power p:

$$P_1 = P_2 - p.$$

In certain of these (N)=3 embodiments, the third power level P3 equals the second power level P2 plus the same increment power p:

$$P_3 = P_2 + p$$

In step 930, the method displays Applicants' evaluation image on a spatial light modulator, such as and without limitation reflective spatial light modulator 110 (FIGS. 1, 2, 5, 6) or transmissive spatial light modulator 210 (FIGS. 3, 4). In certain embodiments, step 930 is performed by drive controller 510 (FIGS. 5, 6). In certain embodiments, step 930 is performed by storage controller 760 (FIG. 7).

In step 940, the method sets (i) to 1. In certain embodiments, step 940 is performed by drive controller 510 (FIGS. 5, 6). In certain embodiments, step 940 is performed by storage controller 760 (FIG. 7).

In step 950, the method energizes the light source, such as and without limitation light source 105 (FIGS. 1, 2, 3, 4, 5, 6), at the (i)th power level, wherein (i) is greater than or equal to 1 and less than or equal to (N). In certain embodiments, step 950 is performed by drive controller 510 (FIGS. 5, 6). In certain embodiments, step 950 is performed by storage controller 760 (FIG. 7). In step 960, the method generates the (i)th reference beam, and in step 970 the method generates the (i)th carrier beam.

In step 975, the method forms the (i)th data beam by reflecting the (i)th carrier beam off an RSLM of step 930, or by passing the (i)th carrier beam through a transmissive SLM of step 930. In step 980, the method illuminates a holographic data storage medium with the (i)th hologram formed by intersecting the (i)th write reference beam of step 960 and the (i)th data beam of step 975. In step 985, the method encodes the (i)th hologram in the data storage medium as the (i)th interference pattern.

In step 990, Applicants' method determines if (i) equals (N). In certain embodiments, step 990 is performed by drive controller 510 (FIGS. 5, 6). In certain embodiments, step 990 is performed by storage controller 760 (FIG. 7). If Applicants' method determines in step 990 that (i) does not equal (N), then the method transitions from step 990 to step 995 wherein the method increments (i) by unity. In certain embodiments, step 995 is performed by drive controller 510 (FIGS. 5, 6). In certain embodiments, step 995 is performed by storage controller 760 (FIG. 7). The method transitions from step 995 to step 950 and continues as described herein.

If Applicants' method determines in step 990 that (i) equals (N), then the method transitions from step 990 to step 1010 (FIG. 10), wherein the method resets (i) to 1. In certain embodiments, step 1010 is performed by drive controller 510 (FIGS. 5, 6). In certain embodiments, step 1010 is performed by storage controller 760 (FIG. 7).

In step 1020, Applicants' method illuminates the (i)th hologram encoded in the holographic data storage medium with a reference beam, such as reference beam 190 (FIGS. 1, 2, 5, 6) or reflected reference beam 290 (FIGS. 3, 4), to generate the (i)th reconstructed data beam, such as reconstructed data beam 185 (FIGS. 2, 6) or reconstructed data beam 285 (FIG. 4), wherein that (i)th reconstructed data beam comprises a reconstructed evaluation image, such as reconstructed evaluation image 135 (FIGS. 2, 6) or reconstructed evaluation image 235 (FIG. 4). In certain embodiments, step 1020 is performed by drive controller 510 (FIGS. 5, 6). In certain embodiments, step 1020 is performed by storage controller 760 (FIG. 7).

In step 1030, Applicants' method projects the (i)th reconstructed data beam of step 1020 onto the optical detector of step 910 (FIG. 9), such as optical detector 140 (FIGS. 1, 2, 3, 4, 5, 6). In step 1040, Applicants' method calculates an (i)th correlation factor using the (i)th reconstructed evaluation image, the stored evaluation image 550 (FIGS. 5, 6, 7), and Applicants' matched filter 560 (FIGS. 5, 6, 7). In certain embodiments, step 1040 is performed by drive controller 510 (FIGS. 5, 6). In certain embodiments, step 1040 is performed by storage controller 760 (FIG. 7).

Figure 8:
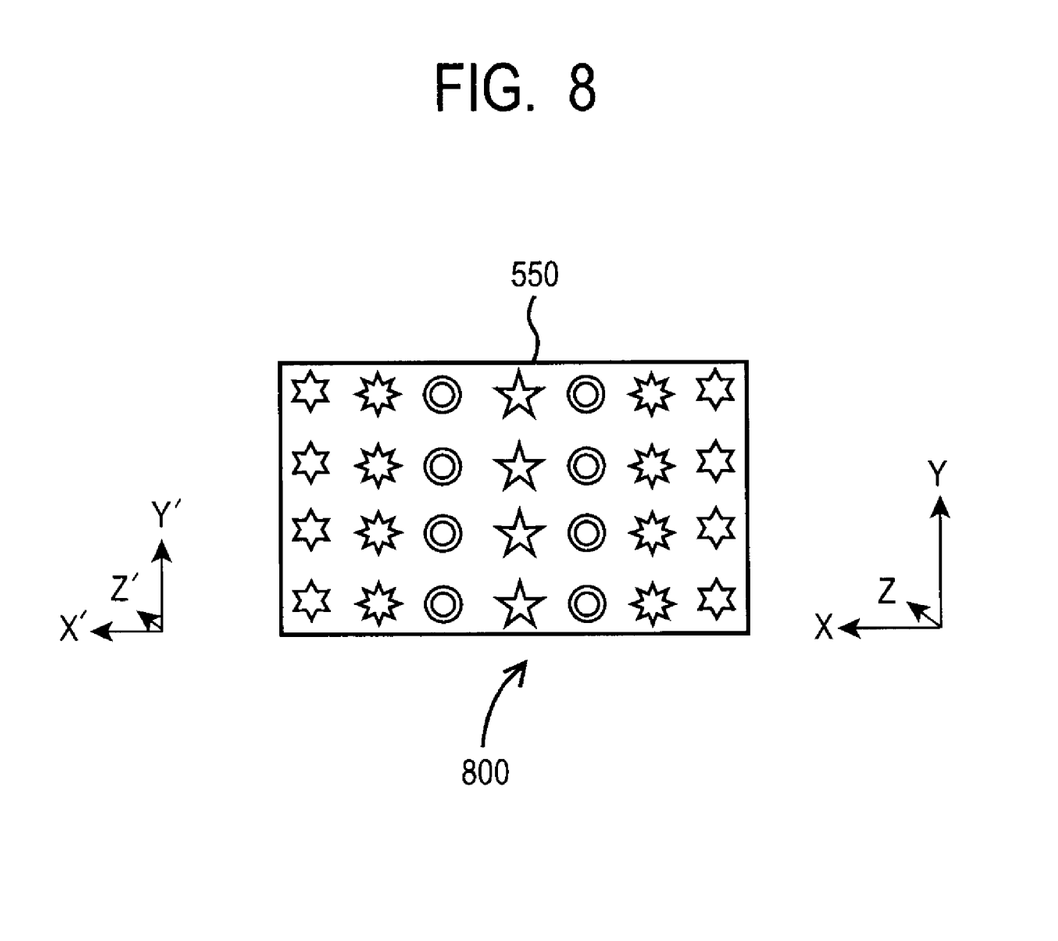
FIG. 8 shows Applicants' evaluation image as seen through Applicants' matched filter.

Referring now to FIG. 8, image 800 comprises Applicants' evaluation image 550 as seen through Applicants' matched filter 560, wherein the X' axis of image is 800 parallel to the X axis of optical detector 140 (FIGS. 1, 2, 3, 4, 5, 6), and wherein the Y' axis of image 800 is parallel to the Y axis of optical detector 140, and wherein the Z' axis of image 800 is parallel to the Z axis of optical detector 140.

In certain embodiments, in step 1040 Applicants' method calculates the difference between the reconstructed evaluation image g(x,y) and impulse response h(x,y)=s*(−x,−y) of the image 800 (FIG. 8). Referring now to Equation (1), V(x,y) comprises the cross-correlation between the reconstructed evaluation pattern, such as for example reconstructed evaluation pattern 185 (FIGS. 2, 6) or 285 (FIG. 4), and s(x,y) for image 800. As those skilled in the art will appreciate, Equation (1) comprises a double integral, meaning that the integration is over the X axis and Y axis directions of the elements of optical detector 140 (FIGS. 1, 2, 3, 4, 5, 6). Additionally, $\xi$ is the integration variable along that X axis, $\eta$ is the integration variable along that Y axis, and * denotes a complex conjugate.

$$V(x,y) = \iint g(\xi,\eta) s^*(\xi-x, \eta-y) d\xi\, d\eta \quad (1)$$

Mathematically, V(x,y) comprises a surface varying along the X axis and the Y axis, for each (x,y). There is one value of V(x,y) for each detector element in detector 140. In certain embodiments, the range V(x,y) for each (x,y) is between −1 and +1, wherein +1 represents the ideal correlation of one hundred (100%). To maximize V(x,y), the following difference surface, Difference (x,y), is defined in Equation (2).

$$\text{Difference}(x,y) = 1 - V(x,y) \quad (2)$$

Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x,y) is evaluated as a root-mean-square. In certain embodiments, Difference(x,y) ranges between 0 and +2, wherein the ideal difference for each value of (x,y) is 0, meaning for a value of 0 that there is no difference between the reconstructed orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the (i)th correlation factor of step 1040 comprises a MAX_Difference which is equal to the maximum value of Difference(x,y). In other embodiments, the (i)th correlation factor of step 1040 comprises an AM_Difference comprising the arithmetic mean of the values of Difference(x,y). In still other embodiments, the (i)th correlation factor of step 1040 comprises a GM_Difference comprising the geometric mean of the values of Difference(x,y). In yet other embodiments, the (i)th correlation factor of step 1040 comprises an RMS_Difference comprising the root-mean-square of the values of Difference(x,y).

In step 1050, Applicants' method saves the (i)th correlation factor of step 1040. In certain embodiments, the (i)th correlation factor is saved in memory disposed in a controller, such as memory 530 (FIGS. 5, 6) disposed in drive controller 510 (FIGS. 5, 6), or memory 763 (FIG. 7) disposed in storage controller 760 (FIG. 7). In certain embodiments, step 1050 is performed by drive controller 510 (FIGS. 5, 6). In certain embodiments, step 1050 is performed by storage controller 760 (FIG. 7).

In step 1060, Applicants' method determines if (i) equals (N). In certain embodiments, step 1050 is performed by drive controller 510 (FIGS. 5, 6). In certain embodiments, step 1050 is performed by storage controller 760 (FIG. 7).

If Applicants' method determines in step 1060 that (i) does not equal (N), then the method transitions from step 1060 to step 1070 wherein the method increments (i) by unity. In certain embodiments, step 1070 is performed by drive controller 510 (FIGS. 5, 6). In certain embodiments, step 1070 is performed by storage controller 760 (FIG. 7). Applicants' method transitions from step 1070 to step 1020 and continues as described herein.

If Applicants' method determines in step 1060 that (i) does equal (N), then the method transitions from step 1060 to step 1080 wherein the method analyzes the (N) correlation factors associated with the (N) encoded evaluation holograms, wherein each of those (N) encoded evaluation holograms was generated using a different one of the (N) power levels of step 920 (FIG. 9).

In certain embodiments, in step 1080 the (i)th correlation value comprises the average Y(i) over the plurality of V(x,y) values determined for the (i)th reconstructed data beam in step 1040. In certain embodiments, Applicants' method subtracts power level P2 from the three power levels as described hereinabove to give three data points, namely [−p,Y(1)], [0, Y(2)], and [p,Y(3)]. As those skilled in the art will appreciate, the equation for a parabola is given in Equation 3, wherein p denotes the incremental laser write power, and wherein B0, B1, and B2 comprise unknowns to solve for, to identify the optimal incremental write power:

$$Y = (B2)(p^2) + (B1)(p) + B0 \quad (3)$$

The least-squares equations wherein (N) is 3 are given in Equations 4a, 4b, and 4c:

$$(N)(B0) + (B1)(\Sigma p) + (B2)(\Sigma p^2) = \Sigma Y \quad (4a)$$

$$(B0)(\Sigma p) + (B1)(\Sigma p^2) + (B2)(\Sigma p^3) = \Sigma(Yp) \quad (4b)$$

$$(B0)(\Sigma p^2) + (B1)(\Sigma p^3) + (B2)(\Sigma p^4) = \Sigma(Yp^2) \quad (4c)$$

Equations 4a, 4b, and 4c, give matrix equation 5 with unknowns B0, B1, and B2:

$$|3\ 0\ 2p^2|\ |B0|\ |Y(1)+Y(2)+Y(3)| \quad (5)$$

$$|0\ 2p^2\ 0|\ |B1| = |p[Y(3)-Y(1)]|$$

$$|2p^2\ 0\ 2p^4|\ |B2|\ |p^2[Y(3)+Y(1)]|$$

Solving Equation 5 for B1 and B2 gives Equations 6a and 6b $$B1 = [Y(3) - Y(1)]/2p \quad (6a)$$

$$B2 = [Y(3) - 2Y(2) + Y(1)]/2p^2 \quad (6b)$$

Solving for dY/dP in Equation 3 and setting that to zero gives the value of the optimal incremental write power, provided that B2<0. If Y(2) is greater than both Y(1) and Y(3), then B2<0. As those skilled in the art will appreciate, the condition that B2<0 results from the second derivative of a parabola being negative when a condition of optimal incremental write power exists.

$$\text{Optimal Incremental write power} = -B1/2B2 \quad (7)$$
$$= (p)[Y(1) - Y(3)]/$$
$$\{2[Y(3) - 2Y(2) + Y(1)]\}$$

Adding power level P2 to both sides of Equation 7 gives Equation 8, wherein Popt equals P2+optimal incremental write power:

$$Popt = P2 - B1/2(B2) \quad (8)$$

Applicants' method transitions from step 1080 to step 1090 wherein the method determines if the optimal power level has been identified. If B2<0, then Applicants' method determines in step 1090 that the optimal power level has been identified, and is given in Equation 8, and the method transitions from step 1090 to step 1095 wherein the method utilizes that optimal power level to encode information in the holographic data storage medium.

Alternatively, if B2≧0, then Applicants' method determines in step 1090 that the optimal power level has not been identified, and the method transitions from step 1090 to step 920 (FIG. 9) wherein the method sets new power levels for evaluation. In certain embodiments, if B2≧0 and Y(3)>Y(1), then in step 920 Applicants' method selects new power levels P4=P3+p, sets P2=P3−p, and repeats the method of FIGS. 9 and 10 using power levels P2, P3, and P4. In certain embodiments, if B2≧0 and Y(3)≦Y(1), then in step 920 Applicants' method sets a new power levels P0=P1−p, P2=P1+p, and repeats the method of FIGS. 9 and 10 using power levels P0, P1, and P2.

In certain embodiments, individual steps recited in FIGS. 9 and 10, may be combined, eliminated, or reordered.

In certain embodiments, Applicants' invention includes instructions, such as instructions 540 (FIGS. 5, 6) and/or instructions 780 (FIG. 7) residing memory 530 (FIGS. 5, 6) or 763 (FIG. 7), respectively, where those instructions are executed by a processor, such as processor 520 (FIGS. 5, 6) or processor 764 (FIG. 7), respectively, to perform one or more of steps 920, 930, 940, 950, 990, and/or 995, recited in FIG. 9, and/or one or more of steps 1020, 1040, 1050, 1060, 1070, 100, 1090, and/or 1095, recited in FIG. 10.

In other embodiments, Applicants' invention includes instructions residing in any other computer program product, where those instructions are executed by a computer external to, or internal to, system 100 or system 200, to perform one or more of steps 330, 340, 350, and/or 360 recited in FIG. 3, and/or one or more of steps 920, 930, 940, 950, 990, and/or 995, recited in FIG. 9, and/or one or more of steps 1020, 1040, 1050, 1060, 1070, 1080, 1090, and/or 1095, recited in FIG. 10. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to determine an optimal power level to encode information holographically, comprising the steps of:
   supplying a holographic data storage system comprising a light source, an evaluation image, a spatial light modulator, an optical detector, and a holographic data storage medium;
   setting (N) power levels, wherein (N) is greater than 1;
   selecting an (i)th power level, wherein (i) is initially set to 1, and wherein (i) is greater than or equal to 1 and less than or equal to (N);
   displaying said evaluation image on said spatial light modulator;
   energizing said light source using the (i)th power level;
   forming an (i)th hologram;
   encoding said (i)th hologram in said holographic data storage medium;
   determining if (i) equals (N);
   operative if (i) does not equal (N):
   incrementing (i) by unity;
   repeating said generating steps, said energizing step, said forming steps, said encoding step, said determining step, and optionally said incrementing step and said repeating step.

2. The method of claim 1, wherein (N) is 3.

3. The method of claim 2, wherein said setting (N) power levels step further comprises:
   selecting a power level P and an incremental power level p;
   setting a second power level equal to P;
   setting a first power level equal to (P−p);
   setting a third power level equal to (P+p).

4. The method of claim 1, wherein said supplying step further comprises supplying a holographic data storage system comprising a matched filter, further comprising the steps of:
   for each value of (i), illuminating the (i)th encoded hologram with a reference beam to generate an (i)th reconstructed data beam comprising an (i)th reconstructed evaluation image;
   for each value of (i), projecting the (i)th reconstructed data beam onto said optical detector;
   for each value of (i), calculating an (i)th correlation factor using the (i)th reconstructed evaluation image, said evaluation image, and said matched filter;
   determining an optimal power level.

5. The method of claim 4, wherein said optical detector comprises a plurality of detector elements, wherein said calculating the (i)th correlation factor step further comprises the steps of:
   calculating a value V(i)(x,y) for each of said plurality of detector elements receiving a portion of the (i)th reconstructed data beam, wherein $$V(i)(x,y) = \iint g(\xi,\eta) s^*(\xi-x, \eta-y) d\xi d\eta;$$

calculating $(i)_{AVG}$;
   wherein:
   V(x,y) comprises a surface varying along a X axis and a Y axis;
   ξ is an integration variable along the X axis;
   η is an integration variable along the Y axis;
   s* is a complex conjugate of an impulse response.

6. The method of claim 5, further comprising the steps of:
   determining if an optimal power level has been found;
   operative if an optimal power level has been found, using said optimal power level to encode information in said holographic data storage medium.

7. The method of claim 6, further comprising the steps of:
   operative if an optimal power level has not been found:
   adjusting said (N) power levels;
   repeating the steps of claims 1 and 4.

8. An article of manufacture, in communication with a holographic data storage system comprising a light source, an evaluation image, a spatial light modulator, an optical detector, and a holographic data storage medium, said article of manufacture comprising a processor and a computer readable medium having computer readable program code disposed therein to determine an optimal power level to encode information holographically, the computer readable program code comprising a series of computer readable program steps to effect:

setting (N) power levels, wherein (N) is greater than 1;
selecting an (i)th power level, wherein (i) is initially set to 1, and wherein (i) is greater than or equal to 1 and less than or equal to (N);
displaying said evaluation image on said spatial light modulator;
energizing said light source using the (i)th power level, thereby forming an (i)th data beam comprising said evaluation image, forming an (i)th hologram, and encoding said (i)th hologram in said holographic data storage medium;
determining if (i) equals (N);
operative if (i) does not equal (N);
incrementing (i) by unity;
repeating said generating steps, said energizing step, said forming steps, said encoding step, said determining step, and optionally said incrementing step and said repeating step.

9. The article of manufacture of claim 8, wherein (N) is 3.

10. The article of manufacture of claim 9, wherein said computer readable program code to set (N) power levels step further comprises computer readable program code comprising a series of computer readable program steps to effect:
selecting a power level P and an incremental power level p;
setting a second power level equal to P;
setting a first power level equal to (P−p);
setting a third power level equal to (P+p).

11. The article of manufacture of claim 8, further comprising a matched filter, said computer readable program code further comprising a series of computer readable program steps to effect:
for each value of (i), illuminating the (i)th encoded hologram with a reference beam to generate an (i)th reconstructed data beam comprising the (i)th reconstructed evaluation image, and projecting the (i)th reconstructed data beam onto said optical detector;
for each value of (i), calculating an (i)th correlation factor using the (i)th reconstructed evaluation image, said evaluation image, and said matched filter;
determining an optimal power level.

12. The article of manufacture of claim 11, wherein said optical detector comprises a plurality of detector elements, wherein said computer readable program code to calculate the (i)th correlation factor step further comprises computer readable program code comprising a series of computer readable program steps to effect:
calculating a value V(i)(x,y) value for each of said plurality of detector elements receiving a portion of the (i)th reconstructed data beam, wherein $$V(i)(x,y) = \iint g(\xi,\eta) s^*(\xi-x, \eta-y) d\xi d\eta;$$

calculating V $(i)_{AVG}$;
wherein:
V(x,y) comprises a surface varying along a X axis and a Y axis;
ξ is an integration variable along the X axis;
η is an integration variable along the Y axis;
s* is a complex conjugate of an impulse response.

13. The article of manufacture of claim 12, said computer readable program code further comprising a series of computer readable program steps to effect:
determining if an optimal power level has been found;
operative if an optimal power level has been found, using said optimal power level to encode information in said holographic data storage medium.

14. The article of manufacture of claim 13, said computer readable program code further comprising a series of computer readable program step to effect adjusting said (N) power levels if an optimal power level has not been found.

15. A computer program product encoded in an information storage medium disposed in a controller comprising a processor and in communication with holographic data storage system comprising a light source, an evaluation image, a spatial light modulator, an optical detector, and a holographic data storage medium, said computer program product being useable with said controller to determine an optimal power level to encode information holographically, comprising:
computer readable program code which causes said programmable computer processor to set (N) power levels, wherein (N) is greater than 1;
computer readable program code which causes said programmable computer processor to display said evaluation image on said spatial light modulator;
computer readable program code which causes said programmable computer processor to sequentially select, for each value of (i), an (i)th power level, wherein (i) is greater than or equal to 1 and less than or equal to (N);
computer readable program code which causes said programmable computer processor to sequentially energize, for each value of (i), said light source using the (i)th power level, thereby generating an (i)th reference beam, generating an (i)th carrier beam forming an (i)th data beam comprising said evaluation image, forming an (i)th hologram, and encode said (i)th hologram in said holographic data storage medium.

16. The computer program product of claim 15, wherein (N) is 3.

17. The computer program product of claim 16, wherein said computer readable program code to set (N) power levels step further comprises:
computer readable program code which causes said programmable computer processor to select a power level P and an incremental power level p;
computer readable program code which causes said programmable computer processor to set a second power level equal to P;
computer readable program code which causes said programmable computer processor to set a first power level equal to (P−p);
computer readable program code which causes said programmable computer processor to set a third power level equal to (P+p).

18. The computer program product of claim 8, said computer readable program code further comprising a series of computer readable program steps to effect:
computer readable program code which causes said programmable computer processor to, for each value of (i), illuminate the (i)th encoded hologram with a reference beam to generate an (i)th reconstructed data beam comprising the (i)th reconstructed evaluation image and project the (i)th reconstructed data beam onto said optical detector;
computer readable program code which causes said programmable computer processor to, for each value of (i), calculate an (i)th correlation factor using the (i)th reconstructed evaluation image, said evaluation image, and said matched filter;
computer readable program code which causes said programmable computer processor to determine an optimal power level.

19. The computer program product of claim 18, wherein said optical detector comprises a plurality of detector elements, wherein said computer readable program code to calculate the (i)th correlation factor step further comprises:

computer readable program code which causes said programmable computer processor to calculate, for each value of (i), a V(i)(x,y) value for each of said plurality of detector elements receiving a portion of the (i)th reconstructed data beam, wherein $$V(i)(x,y) = \iint g(\xi,\eta) s^*(\xi-x, \eta-y) d\xi d\eta;$$

computer readable program code which causes said programmable computer processor to calculate, for each value of (i), $V(i)_{AVG}$;

wherein:

V(x,y) comprises a surface varying along a X axis and a Y axis;

$\xi$ is an integration variable along the X axis;

$\eta$ is an integration variable along the Y axis;

$s^*$ is a complex conjugate of an impulse response.

20. The computer program product of claim 12, further comprising:

computer readable program code which causes said programmable computer processor to determine if an optimal power level has been found;

computer readable program code which, if an optimal power level has been found, causes said programmable computer processor to use said optimal power level to encode information in said holographic data storage medium.

* * * * *